United States Patent [19]

Guzick

[11] 4,103,428
[45] Aug. 1, 1978

[54] PIPE JOINT ALIGNMENT MEASURING TOOL

[76] Inventor: Lawrence L. Guzick, 10322 Royal Rd., Silver Spring, Md. 20903

[21] Appl. No.: 847,649

[22] Filed: Nov. 1, 1977

[51] Int. Cl.² .............................................. G01B 5/24
[52] U.S. Cl. .................................. 33/180 R; 33/1 BB; 33/84
[58] Field of Search .................. 33/180 R, 181 R, 84, 33/112, 113, 169 R, 174 M, 174 N, 1 BB, 184.5

[56] References Cited

FOREIGN PATENT DOCUMENTS 972,407   8/1950   France ........................... 33/181 R Primary Examiner—Harry N. Haroian
Attorney, Agent, or Firm—R. Sciascia; R. Beers; S. Sheinbein

[57] ABSTRACT

A pipe joint alignment tool comprising a segment of a clear plastic cylinder which, when placed on the surfaces of opposing pipe joint flanges, allows the measurement of twist, parallelism, face to face dimension, and lateral displacement between the pipes at the joint by visual inspection of the position of the pipe flanges relative to lines scribed on the surface of the cylinder.

5 Claims, 1 Drawing Figure

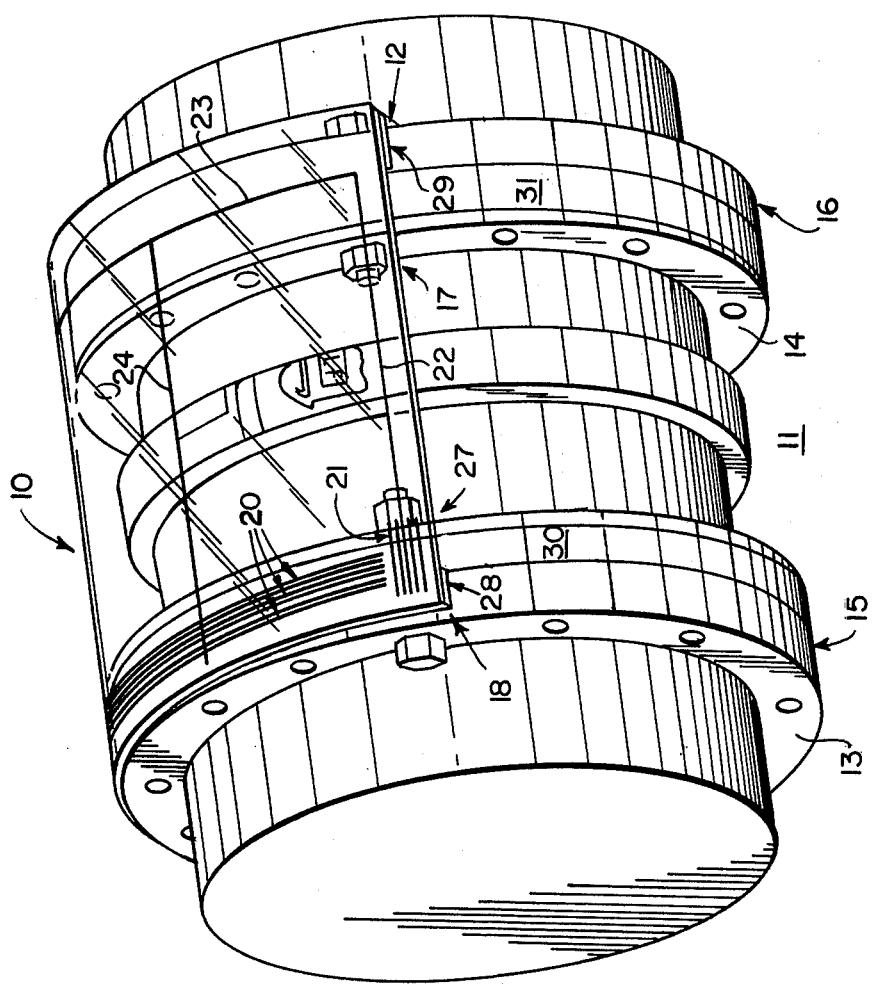

PIPE JOINT ALIGNMENT MEASURING TOOL

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates to measuring devices and more particularly to devices for measuring the alignment and misalignment of interconnected pipes, shafts, and their joints.

Prior art devices designed to measure alignment of flange coupled pipes and shafts have commonly employed arcuate members configured so they may be secured in close-fitting relation to the pipes or shafts immediately adjacent to the joint whose alignment is to be ascertained. The arcuate members are accurately positioned so their alignment reflects the alignment of the pipe or shaft to which they are affixed. These members then serve as a base structure for instruments which project across the joint and measure the position and alignment of the flanges and the opposing pipe. Unfortunately, these devices are bulky and costly besides being difficult and time consuming to use.

Simplified techniques have been required to measure the alignment of rubber expansion joints in water pipes comprised of a central section housing a flanged elastic expansion segment secured to the main pipes by a split flange arrangement. It is often necessary for many such joints to be checked in short periods of time. Therefore, to affect a rapid procedure for checking such joints, pairs of opposing holes have been drilled on the pipe flanges between which diagonal and axial distances can be quickly measured to check flange and pipe alignment. At best, this method alerts the technician to possible changes in alignment since previous readings were made. It does not provide the mathematics necessary to translate the readings into absolute values of misalignment, and, even if it did, it would be extremely difficult to use because of the accuracy needed in placing holes and making diagonal readings. Consequently, no simple, accurate, and rapid technique currently exists for measuring the alignment of pipes, shafts, and their joints as is especially needed for use in determining the alignment of water pipe expansion joints on ships.

SUMMARY OF THE INVENTION

Accordingly, the present invention provides an alignment measuring tool for use on pipe and shaft joints comprising a rigid, transparent, arcuate member having a radius of curvature equal to that of the outer surface of the flanges of the joint whose alignment is to be measured. This member is shaped so it may be placed across the surfaces of opposing pipe joint flanges, its curvature close fitting along the curvature of the surfaces of the flanges. Lines are scribed on the arcuate member representing the expected interflange dimensions and possible deviations therefrom corresponding to various degrees of misalignment. When the arcuate member is properly positioned, visual inspection of the alignment of the flanges relative to the lines scribed on the arcuate member allows measurement of twist, parallelism, and face to face dimension. Lateral displacement between the pipes or shafts at the joint can be measured at a corner of the arcuate member by sighting the displacement between the corner and the joint flange.

OBJECTS OF THE INVENTION

It is therefore, an object of the present invention to provide a simple to use, rapid in operation, yet accurate instrument for measuring the alignment of interconnected pipes, shafts, and their joints.

Another object of the present invention is to provide an alignment instrument compact in structure and inexpensive to manufacture.

A further object of the present invention is to provide an alignment instrument especially efficient in measuring the alignment of rubber expansion joints on ships.

A yet further object of the present invention is to provide an alignment instrument strong and reliable, durable in operation, and otherwise well adapted to the purposes for which the same is intended.

BRIEF DESCRIPTION OF THE DRAWINGS

Other objects and many attendant advantages of this invention will be readily appreciated as the same becomes better understood by reference to the following detailed description when considered in connection with the accompanying drawings, wherein:

The FIGURE is a perspective view of the present invention positioned to measure alignment between the pipes and joint member of a rubber expansion joint pipe joint.

DESCRIPTION OF THE EMBODIMENT

Referring now to the FIGURE, an arcuate member 10 is shown in position to measure alignment of a water pipe expansion joint 11. Arcuate member 10 is approximately a quarter segment of a length of transparent, regular, cylindrical pipe having a narrow shoulder 12 along one edge projecting out from its interior surface and having a length approximately as great as the distance between the flanges. The radius curvature of the member 10 is slightly greater than the outer radius of the flanges 13 and 14 securing the rubber pipe joint 11. Arcuate spacers 28 and 29 slightly narrower than and contoured to fit along the metal parts 15 and 16 of the pipe flanges are attached to the underside of the arcuate member 10 along its width to allow for clearance in the event the rubber flange parts 30 and 31 of the rubber pipe joint 11 extrude outward when the flange bolts 17 and 27 are tightened. Spacers 28 and 29 are as thin as possible consistent with their function. Lines 22, 23, and 24 and line sets 20 and 21 are scribed on the surface of the member 10 corresponding to expected interflange dimensions and possible deviations therefrom representing various degrees of misalignment.

Misalignment of the pipes and pipe joint is reflected in misalignment of the pipe joint flanges, so therefore pipe and pipe joint misalignments may be measured by comparing measured interflange dimensions to expected distances. This comparing function may be accomplished for the several possible modes of misalignment of pipe joints using the arcuate member 10 as follows: Arcuate member 10 is placed across the flanges 13 and 14 such that the surfaces of spacers 28 and 29 fit as flush as possible against the surfaces of parts 15 and 16, and shoulder 12 fits along the outerside edge of the flange 14. When the arcuate member 10 is thus properly positioned the line 23 should coincide with the mating surface of pipe flange part 16 and rubber flange part 31 as shown. In order to simplify description, the above specified position for the member 10 is hereinafter termed the standard orientation of arcuate member.

Any lateral displacement of the pipes forming the joint may be detected by slidably rotating, through 180°, the arcuate member 10 while it is maintained in standard orientation, until the position is located where one of the opposite edges of the member 10 is displaced a maximum distance outward from the surface of the flange 15. Measuring this displacement and dividing by 1.4 to correct for geometric effects yields the true lateral displacement. Twist may be determined by lining up longitudinal lines 22 with the center of bolt 17 while the arcuate member is held in standard orientation. The amount of twist may then be measured by observing the position of bolt 27 in relation to lines 21 which represent progressively greater amounts of twist misalignment as their distances from line 22 increases. Any misalignment in parallelism may be detected by slidably rotating, through 180°, arcuate member 10 around pipe joint 11, while it is maintained in standard orientation, until the position is located where the difference in the axial offset of the mating surface of flange part 15 and rubber flange part 30 relative to any one of lines 20 over the length of lines 20 is maximum. The maximum difference in axial offset along the length of lines 20 represents a measure of parallelism misalignment. The face to face distance of the pipe joint 11 may be measured by again slidably rotating arcuate member 10 around the pipe joint until, in this case, two positions are located, one corresponding to a maximum distance along line 24 from line 23 to the mating surface of flange part 15 and rubber flange part 30 and the minimum distance for the same dimension. Averaging the two distances so detected yields a value for the face to face dimension of the pipe joint 11.

Thus it is apparent that there is provided by this invention a pipe joint alignment tool simple to use, rapid in operation, and compact in structure. Further, the present invention in durable and inexpensive, yet accurate in measuring the alignment of pipes, shafts, and their joints; and is especially suited to measuring the alignment of water pipe expansion joints on ships.

Obviously, other embodiments and modifications of the present invention will readily come to those of ordinary skill in the art having the benefit of the teachings presented in the foregoing description and drawings. For example, embodiments of the present invention may be made adjustable for different face to face dimensions by incorporating a two piece sliding arrangement as in a slide rule or add on strips which can quickly be screwed on to the ends which rest on the flange faces thereby adapting the device for different diameter flanges. The arcuate member illustrated in the FIGURE may be constructed of thin metal bars bent to the radius of the flanges and rigidly connected by structural members. It therefore, to be understood that this invention is not to be limited to the described embodiments and modifications and that said other modifications and emodiments are intended to be included within the scope of the appended claims.

What is claimed and desired to be secured by Letters Patent of the United States is:

1. A measuring instrument for determining the alignment between two pipes, said pipes coupled to each other through a joint and split flange arrangement, comprising:

an arcuate member having a radius of curvature approximately equal to the radius of curvature of the outer surface of said flanges;

said member having a shoulder at one longitudinal end extending below the interior surface of said member and having lines marked on its surface;

whereby when said arcuate member is placed across said joint flush with against said flange surfaces with its shoulder abutting the side of one of said flanges, lateral displacement, twist, parallelism, and face to face dimensions of said joint may be compared to reference distances represented by said lines.

2. The instrument of claim 1 wherein said arcuate member comprises a segment of transparent plastic cylinder.

3. The instrument of claim 2 wherein said arcuate member comprises a quarter section of said cylinder.

4. The instrument of claim 1 further including arcuate spacers attached to the interior surface of said arcuate member such that the arcuate member is displaced away from the surfaces of the flanges.

5. A measuring instrument for determining the alignment between two pipes, said pipes coupled through a joint and split flange arrangement, comprising:

a rigid member which, when properly positioned, contacts one of said flanges along a segment of its arced outer surface and contacts the other flange at least one point along its outer surface, said rigid member having a shoulder at one end, which, when said member is properly positioned abuts against the side of one of said flanges, said rigid member having lines marked on its surface whereby, when said member is properly positioned against said flanges, lateral displacement, twist, parallelism and face to face dimensions of said joint may be compared to reference distances represented by said lines.

* * * * *